(No Model.)

B. F. BERGH.
GEAR WHEEL.

No. 272,940. Patented Feb. 27, 1883.

Witnesses
H. D. Williams
E. G. Baker.

Bror F. Bergh
Inventor
per Alfred Theoloch
Atty.

N. PETERS. Photo-Lithographer, Washington, D. C.

UNITED STATES PATENT OFFICE.

BROR F. BERGH, OF NEW YORK, N. Y., ASSIGNOR TO E. E. GARVIN & CO., OF SAME PLACE.

GEAR-WHEEL.

SPECIFICATION forming part of Letters Patent No. 272,940, dated February 27, 1883.

Application filed November 22, 1882. (No model.)

*To all whom it may concern:*

Be it known that I, BROR F. BERGH, a citizen of the United, and a resident of the city, county, and State of New York, have invented certain new and useful Improvements in Gear-Wheels, of which the following is a specification.

This invention relates to split gears, or that class of gear-wheels divided into two parts on a plane at right angles to their axes, parting the teeth through the center, so as to permit one side of the teeth to be adjusted ahead of the other side, to remove backlash therefrom; and it has for its object a simple and effective means to accomplish such adjustment and to hold the two parts of the wheel rigidly in position when adjusted. In gear-wheels of this description as generally made the two parts are held together by means of three or more screws, the clearance-holes in the part in which the heads of the screws are placed being made sufficiently large to permit of the requisite amount of adjustment, and the clamping-pressure of the screws to hold the parts together by the friction of their adjacent faces is the only means to prevent the displacement of the adjustment, which often occurs in machines in which considerable strain is brought to bear on such divided wheels. Now, I effectually prevent such displacement and provide for the perfect regulation of the teeth by forming an elongated hole through one part of the wheel and having one of its ends inclined, and placing in said hole a steel wedge provided with a guide and resistance pin, which passes into a hole in the other part of the wheel, and a screw passing through the wedge, and also fitting into a tapped hole in the second part of the wheel, the whole being within the surfaces of the sides of the wheel. By simply turning this screw after the three clamp-screws are loosened the wedge is drawn down into the elongated hole, thereby causing this part of the wheel to slide over the other part, to bring one side of each tooth ahead of the other side, or, in other words, to increase the working thickness of the teeth, so as to cause them to perfectly fill the spaces between the teeth of the accompanying gear-wheel, or the spaces between the threads of the worm when the invention is applied to worm-wheels. The clamping-screws are employed to hold the two parts of the wheel together, the wedge, with its guide and resistance pin, forming a solid connection between the two parts, so as to effectually resist any tendency of the parts to lose their adjustment when once properly set.

Figure 1:
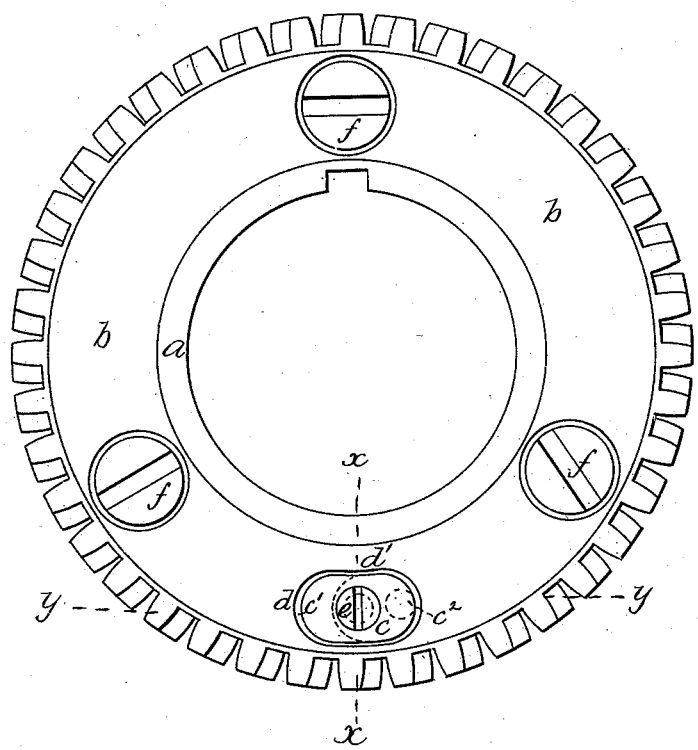
Figure 2:
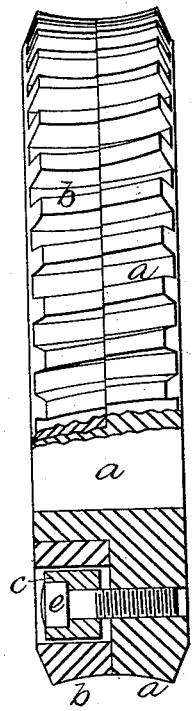
Figure 3:
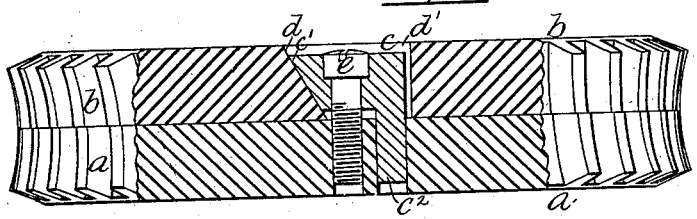
Figure 4:
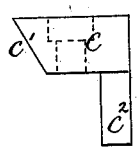

In the accompanying drawings, forming part of this specification, Figure 1 represents a face view of a worm-wheel to which is applied my invention. Fig. 2 is a side view of the same, partly in section, cut on the line $x\,x$. Fig. 3 is another side view, partly in section, cut through the line $y\,y$; and Fig. 4 is a detached view of the adjusting-wedge.

$a$ and $b$ represent a worm-wheel, the part $b$ consisting of a ring fitted on the hub of $a$ and against its side. The teeth are formed equally on the peripheries of the parts $a$ and $b$, so that by moving the ring $b$ on $a$ the halves of the teeth on $b$ may be set in advance of the other halves of teeth on $a$. This adjustment of the teeth, which in practice requires to be under perfect control to properly take up the backlash, is accomplished by means of the piece $c$, having a rounded inclined end, $c'$, which bears against the inclined end $d$ of the elongated hole $d'$, formed in the ring $b$, when the piece $c$ is drawn down in the hole $d'$ by means of the screw $e$. This screw $e$ turns freely in the piece $c$ and fits into a tapped hole in the part $a$ of the wheel. The piece $c$ is also provided with the guide and resistance pin $c^2$, which is fitted to slide in a hole in the part $a$ adjacent to the tapped hole in which the screw $e$ works, so that said piece $c$ is guided and rigidly held, as regards angular movement, to the piece $a$, and, by means of its inclined end $c'$, causes the ring $b$ to slide in an angular direction on $a$, to adjust the working thickness of the teeth of the wheel, as shown at Figs. 2 and 3.

To hold the parts $a$ and $b$ together, three screws, $f\,f\,f$, pass through holes in the ring part $b$, which are larger than the shanks of the screws, to allow of the adjustment, as described, and they screw into the part $a$, as in the common practice employed in this class of gears; but it will be observed that dependence on the clamping-power of the screws $f\,f\,f$ to hold $a$ and $b$ together is avoided, as the wedge-piece $c$ forms a perfect solid connection to resist all back strains between $a$ and $b$, as well as providing a simple means for their perfect and fine adjustment. It will also be observed that the whole is so constructed that no part of the adjusting and holding devices projects beyond the side surfaces of the wheel.

I have shown my improvement as applied to a worm-gear. It is evident that it is equally well applicable to straight gears, or to any other mechanical device in which two parts are required to be angularly adjusted in relation to one another.

My improved adjusting-wedge may be used in conjunction with any other means for holding the parts of the wheel together.

What I claim, and desire to secure by Letters Patent, is—

1. The combination, with the two parts of a divided gear or worm wheel, of a wedge-piece provided with a guide and resistance pin arranged within the side surface of the wheel, and a screw, also arranged within the side surface of the wheel, fitting in one part of the wheel and adapted to draw the wedge-piece against an inclined surface on the other part of the wheel, whereby the angular position of the parts of the teeth on the two parts of the wheel may be positively regulated in relation to one another, substantially as set forth.

2. In combination, the wheel formed of the two parts $a$ and $b$, the wedge-piece $c$, having inclined end $c'$ and guide, resistance-pin $c^2$, the screw $e$, and the clamping-screws $fff$, substantially as and for the purpose set forth.

In witness whereof I have hereunto set my hand, at New York, county and State of New York, this 20th day of November, A. D. 1882.

BROR F. BERGH.

Witnesses:
E. E. GARVIN,
H. D. WILLIAMS.